(12) United States Patent
Makinouchi et al.

(10) Patent No.: US 7,723,671 B2
(45) Date of Patent: May 25, 2010

(54) POSITIONAL INFORMATION DETECTING DEVICE

(75) Inventors: Susumu Makinouchi, Zama (JP); Toru Imai, Natori (JP); Akihiro Watanabe, Sendai (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/144,936

(22) Filed: Jun. 24, 2008

(65) Prior Publication Data
US 2008/0258050 A1    Oct. 23, 2008

Related U.S. Application Data

(63) Continuation of application No. PCT/JP2006/326007, filed on Dec. 27, 2006.

(30) Foreign Application Priority Data

Dec. 28, 2005  (JP) ............................. 2005-378687
Jan. 23, 2006  (JP) ............................. 2006-013527

(51) Int. Cl.
*G01D 5/34*      (2006.01)
*G06M 7/00*      (2006.01)
(52) U.S. Cl. ................................. 250/231.13; 250/221
(58) Field of Classification Search ............. 250/231.13, 250/231.14, 231.16; 341/11–13; 356/399–401
See application file for complete search history.

(56) References Cited

U.S. PATENT DOCUMENTS

| | | | |
|---|---|---|---|
| 5,057,686 A * | 10/1991 | Hikawa et al. | ......... 250/231.16 |
| 6,639,686 B1 | 10/2003 | Ohara | |
| 7,061,624 B2 * | 6/2006 | Ishizuka | ..................... 356/499 |
| 2002/0014581 A1 * | 2/2002 | Yamamoto et al. | ..... 250/231.13 |
| 2002/0021450 A1 | 2/2002 | Aoki | |
| 2005/0140985 A1 | 6/2005 | Takahashi | |

FOREIGN PATENT DOCUMENTS

| | | |
|---|---|---|
| JP | A 63-90719 | 4/1988 |
| JP | A 2002-90114 | 3/2002 |
| JP | A 2005-3438 | 1/2005 |
| JP | A 2005-147828 | 6/2005 |

* cited by examiner

*Primary Examiner*—Que T Le
*Assistant Examiner*—Jennifer Bennett
(74) *Attorney, Agent, or Firm*—Oliff & Berridge, PLC (57) ABSTRACT

A light via first and second index scales is split by a beam splitter, and one of the split lights is received by a first light-receiving element via a movable scale and also the other of the split lights is received by a second light-receiving element via a reference scale, and therefore by computing positional information of the movable scale using an output of the first light-receiving element (a first output) and an output of the second light-receiving element (a second output), movement information of the movable scale can be measured with high precision without being affected by drift of the modulation center (the oscillation center) of the beam.

13 Claims, 8 Drawing Sheets

POSITIONAL INFORMATION DETECTING DEVICE

CROSS-REFERENCE TO RELATED APPLICATIONS

This application is a continuation of International Application PCT/JP2006/326007, with an international filing date of Dec. 27, 2006, the disclosure of which is hereby incorporated herein by reference in its entirety, which was not published in English.

BACKGROUND OF THE INVENTION

1. Field of the Invention

The present invention relates to encoders, and more specifically, to an encoder that optically detects positional information of a scale for measurement with respect to a beam-splitting optical system.

2. Description of the Background Art

Conventionally, a method, in which by irradiating a light beam from a detection head to an optical scale that has a periodic structure like a phase diffraction grating and receiving the light beam with a light-receiving element, a relative positional relation between the detection head and the optical scale and a relative motion direction of both of them are measured, is used in general.

In the method that has been most commonly used recently, periodic signals whose phases are different by 90-degrees from each other are detected from a light beam via the optical scale, and a relative positional relation between the detection head and the optical scale and a relative motion direction of both of them are measured based on a relation between amplitude and phase of the two signals. Further, in order to solve reduction in detection resolution occurred in this method that is caused by reduction in the S/N ratio of the detection signals due to noise, the method described in U.S. Pat. No. 6,639,686 can be used. According to the method described in U.S. Pat. No. 6,639,686, the detection signal is modulated by oscillation of a light beam, and when measuring the relative positional relation between the detection head and the optical scale and the relative motion direction of both of them, the signal is demodulated. The S/N ratio can be improved by such a demodulating process, and as a consequence, the detection resolution can be improved.

In the method described in U.S. Pat. No. 6,639,686, however, in order to oscillate the light beam, an optical element that can be oscillated is placed in an optical path, and the optical element is oscillated. In this case, when drift occurs in the oscillation center of the light beam, the detection result includes error, which could hinder the high-precision position detection.

Further, as a conventional common optical encoder, an encoder by a diffraction interference method is known: which is equipped with a diffraction grating that moves along a movable body and has gratings formed at regular intervals orthogonally to a moving direction, an irradiation optical system that irradiates a coherent beam to the diffraction grating, and a detector that makes the diffraction lights diffracted by the diffraction grating interfere and detects the intensity change of the interference light; and detects a moving distance of the diffraction grating (e.g. refer to Kokai (Japanese Patent Unexamined Application) No. 2005-003438 and the like).

In such an encoder, there could be the case where a member that holds the light source or the diffraction grating expands/contracts due to heat generated from the light source and the relative positional relation between the light source and the diffraction grating changes over time. This positional deviation causes detection error of the moving distance of the diffraction grating.

SUMMARY OF THE INVENTION

According to the present invention, there is provided an encoder, comprising: a scale for measurement on which a pattern arranged along a predetermined direction is formed; a beam-splitting optical system that splits an incident illumination light at least into a first light that is irradiated to the scale for measurement and a second light that includes information on an irradiation position of the first light on the scale for measurement; a photoreceiver for the second light that receives the second light; and a detection device that detects the information on the irradiation position of the first light on the scale for measurement based on a light-receiving result of the photoreceiver for the second light.

With this encoder, the beam-splitting optical system is placed that splits an incident illumination light at least into a first light that is irradiated to the scale for measurement and a second light that includes information on an irradiation position of the first light on the scale for measurement, and the information on the irradiation position of the first light is detected by the second light. Since the first light and the second light are the lights generated from the same illumination light, the information on the irradiation position of the first light can accurately be detected by using the second light.

BRIEF DESCRIPTION OF THE DRAWINGS

In the accompanying drawings.

DESCRIPTION OF THE EMBODIMENTS

First Embodiment

Figure 1:
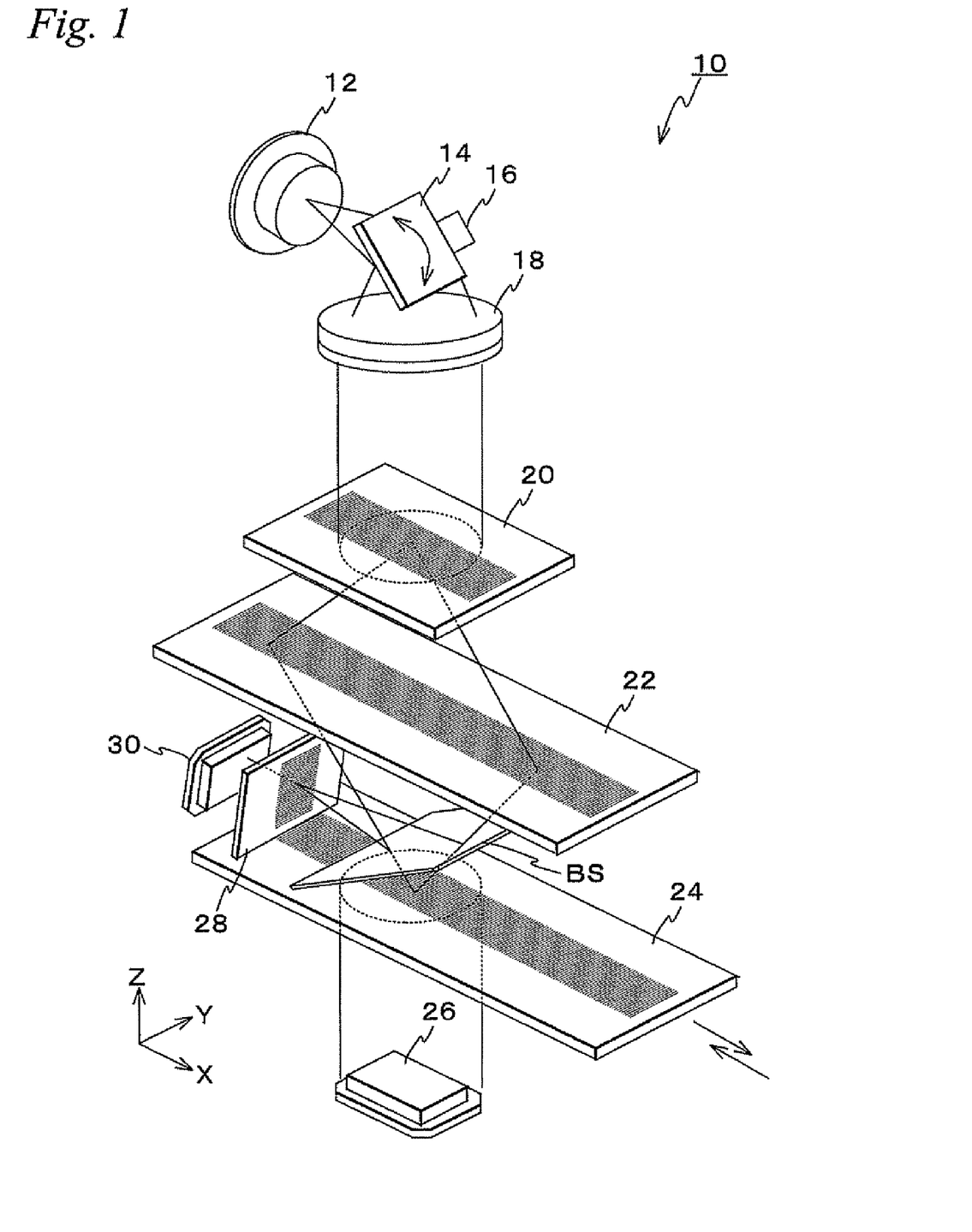
FIG. 1 is a perspective view showing an encoder related to a first embodiment.

A first embodiment of the present invention will be described below, based on FIG. 1. FIG. 1 schematically shows a configuration of an encoder 10 related to the first embodiment of the present invention. Encoder 10 is a so-called encoder by a diffraction interference method, which is a linear encoder that detects a moving direction, a moving distance, or a displacement of a movable body (e.g. a stage or the like) that moves in a predetermined direction.

As is shown in FIG. 1, encoder 10 includes a light source 12, an oscillating mirror 14, a collimator lens 18, a first diffraction optical element (a first index scale) 20, a second diffraction optical element (a second index scale) 22, a beam splitter BS, a movable scale (a movable diffraction grating) 24, a first light-receiving element 26, a reference scale (a fixed diffraction grating) 28, and a second light-receiving element 30.

Light source 12 is a light source that emits, for example, a coherent light, for example, a laser light having a wavelength $\lambda$ (=850 nm) toward a +X direction in FIG. 1.

Oscillating mirror 14 reflects the laser light from light source 12 toward first diffraction optical element 20. Oscillating mirror 14 is periodically oscillated in a rotational direction around a Y-axis by a drive mechanism 16 that includes an actuator. Accordingly, to be exact, a reflection direction of the light incident on oscillating mirror 14 differs depending on the orientation of the reflection surface of oscillating mirror 14 and an angle of an illumination light incident on collimator lens 18 is periodically modulated.

Collimator lens 18 converts the laser light reflected off oscillating mirror 14 into a parallel light.

First index scale 20 is a transmissive-type phase grating that is composed of a plate on which a diffraction grating having a periodic direction in an X-axis direction is formed, and the parallel light that has been transmitted through collimator lens 18 is incident on first index scale 20. First index scale 20 generates a plurality of diffracted lights based on the incident parallel light. Out of these diffracted lights, FIG. 1 shows±first-order diffracted lights generated at first index scale 20 (in FIG. 1, a diffracted light outgoing to the +X side is a+first-order diffracted light and a diffracted light outgoing to the −X side is a first-order diffract light).

Similarly to first index scale 20, second index scale 22 is a transmissive-type phase grating that is composed of a plate on which a diffraction grating having a periodic direction in the X-axis direction is formed, and is placed between first index scale 20 and movable scale 24. Second index scale 22 produces a+first-order diffracted light by diffracting the−first-order diffracted light generated at first index scale 20, and such a+first-order diffracted light proceeds toward movable scale 24. Further, second index scale 22 produces a−first-order diffracted light by diffracting the+first-order diffracted light generated at first index scale 20, and such a−first-order diffracted light proceeds toward movable scale 24.

In this case, the±first-order diffracted lights produced at second index scale 22 are transmitted though beam splitter BS, and overlap with each other at the same position on movable scale 24. That is, the±first-order diffracted lights interfere with each other on movable scale 24.

Similarly to first and second index scales 20 and 22, movable scale 24 is a transmissive-type phase grating that is composed of a plate on which a diffraction grating (a first pattern) having a periodic direction in the X-axis direction is formed. Movable scale 24 produces a−first-order diffracted light by diffracting the+first-order diffracted light produced at second index scale 22 and produces a+first-order diffracted light by diffracting the−first-order diffracted light produced at second index scale 22. Then, these±first-order diffracted lights are incident on first light-receiving element 26 in a state of interfering with each other. As a consequence, first light-receiving element 26 outputs an electric signal that shows the interference intensity of the interference light.

Incidentally, in the embodiment, the grating pitch of first index scale 20 and that of movable scale 24 are to be the same, and the grating pitch of second index scale 22 is to be a half of the grating pitch of first index scale 20 and movable scale 24.

Meanwhile, in the embodiment, out of the±first-order diffracted lights diffracted at second index scale 22, a light reflected off beam splitter BS is incident on reference scale 28 that is arranged between second index scale 22 and movable scale 24. Reference scale 28 is a transmissive-type phase grating that is composed of a plate on which a diffraction grating (a second pattern) having a periodic direction in the Y-axis direction is formed, and its positional relation with first index scale 20 and its positional relation with second index scale 22 are fixed (maintained). In this case, in the first embodiment, the grating pitch of the diffraction grating that reference scale 28 has is set to be the same pitch as the grating pitch of the diffraction grating that movable scale 24 has.

Similarly to the case of movable scale 24, reference scale 28 diffracts the−first-order diffracted light emitted from second index scale 22 (in FIG. 1, a+first-order diffracted light diffracted at reference scale 28 proceeds in the −X direction). Further, reference scale 28 diffracts the+first-order diffracted light emitted from second index scale 22 (in FIG. 1, a−first-order diffracted light diffracted at reference scale 28 proceeds in the −X direction).

Then, the+first-order diffracted light and the−first-order diffracted light that respectively proceed in the −X direction are incident on second light-receiving element 30 in a state of interfering with each other. As a consequence, second light-receiving element 30 outputs an electric signal that shows the interference intensity of the interference light.

In the first embodiment, since the positional relation between reference scale 28 and first index scale 20 and the positional relation between reference scale 28 and second index scale 22 are fixed (maintained), the output from second light-receiving element 30 only shows information on oscillation of the beam and therefore information on the oscillation center of the beam can be acquired from the output.

In the meantime, in the first embodiment, there is the possibility that the oscillation center of the beam is drifted in accordance with change in the temperature or humidity of the atmosphere in which encoder 10 is installed. Therefore, first light-receiving element 26 could acquire information that is movement information of movable scale 24 including the drift of the oscillation center of the beam.

Accordingly, in the embodiment, a controller (not shown) computes positional information of movable scale 24 as in the following equation (1), using the output by first light-receiving element 26 (which is referred to as an "output 1") and the output by second light-receiving element 30 (which is referred to as an "output 2").

(Positional information of the movable scale)=(Output 1)−$k$×(Output 2)     (1)

In this case, a coefficient k is a conversion coefficient that is computed from the difference between the output of first light-receiving element 26 and the output of second light-receiving element 30 when the beam is oscillated in a state where movable scale 24 is fixed, before performing the measurement using encoder 10 in actual.

Incidentally, in actual, the output 1 by first light-receiving element 26 and the output 2 by second light-receiving element 30 are signals that have been modulated by oscillating mirror 14, and therefore the outputs 1 and 2 are respectively converted into positional information using Bessel series expansion related to time, and then positional information of the movable scale is computed using the equation (1).

With this operation, positional information of movable scale 24 can be measured with high precision without being affected by the drift of the oscillation center due to the change in the temperature or humidity, or the like of the atmosphere in which encoder 10 is installed.

As is described above, according to the encoder of the first embodiment, the light via first and second index scales 20 and 22 is split by beam splitter BS, and one of the split lights is received by first light-receiving element 26 via movable scale 24 and the other of the lights is received by second light-receiving element 30 via reference scale 28, and second light-receiving element 30 can detect only information on oscillation of the laser light because a positional relation of reference scale 28 with beam splitter BS is fixed. Accordingly, by computing positional information of movable scale 24 using the output 1 of first light-receiving element 26 (the output in this case includes true movement information of movable scale 24 and information on oscillation of the laser light) and the output 2 of second light-receiving element 30, movement information of movable scale 24 can be measured with high accuracy without being affected by the drift of the modulation center (the oscillation center) of the laser light.

Incidentally, in the first embodiment described above, the case has been described where first index scale 20 and second index scale 22 are used, but the present invention is not limited thereto, and any configuration may be employed as far as the configuration includes a beam-splitting element that splits a laser light into two lights and an optical member that makes the two lights interfere with each other on movable scale 24.

Figure 2:
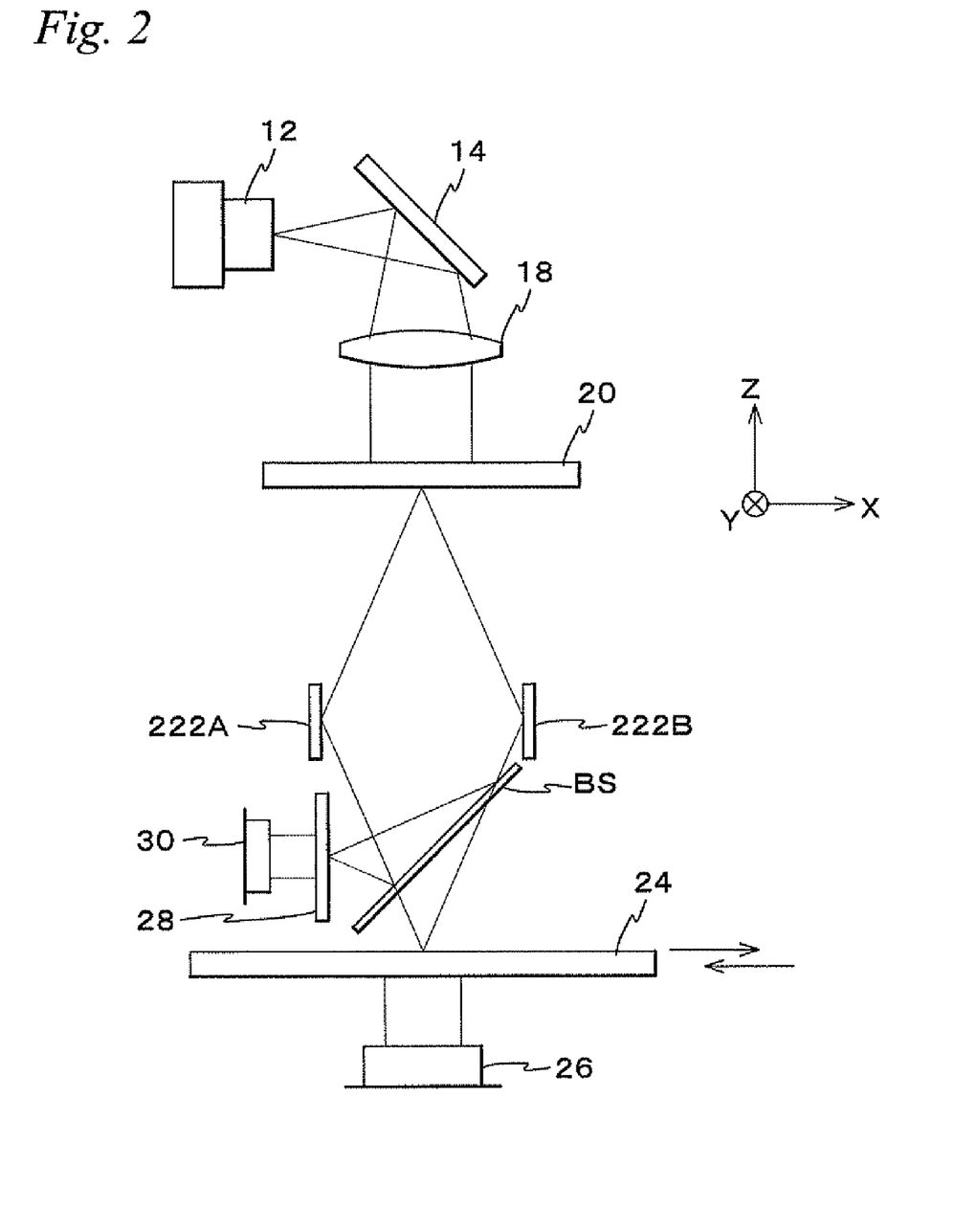
FIG. 2 is a view showing a modified example (No. 1) of the first embodiment.

For example, as is shown in FIG. 2, as the beam-splitting element, index scale 20 similar to that in the first embodiment may be arranged, and as the optical member, a pair of mirrors 222A and 222B may be arranged instead of the second index scale.

Further, as the beam-splitting element, the present invention is not limited to the case where the index scales are used, but for example a beam splitter can also be used.

Figure 3:
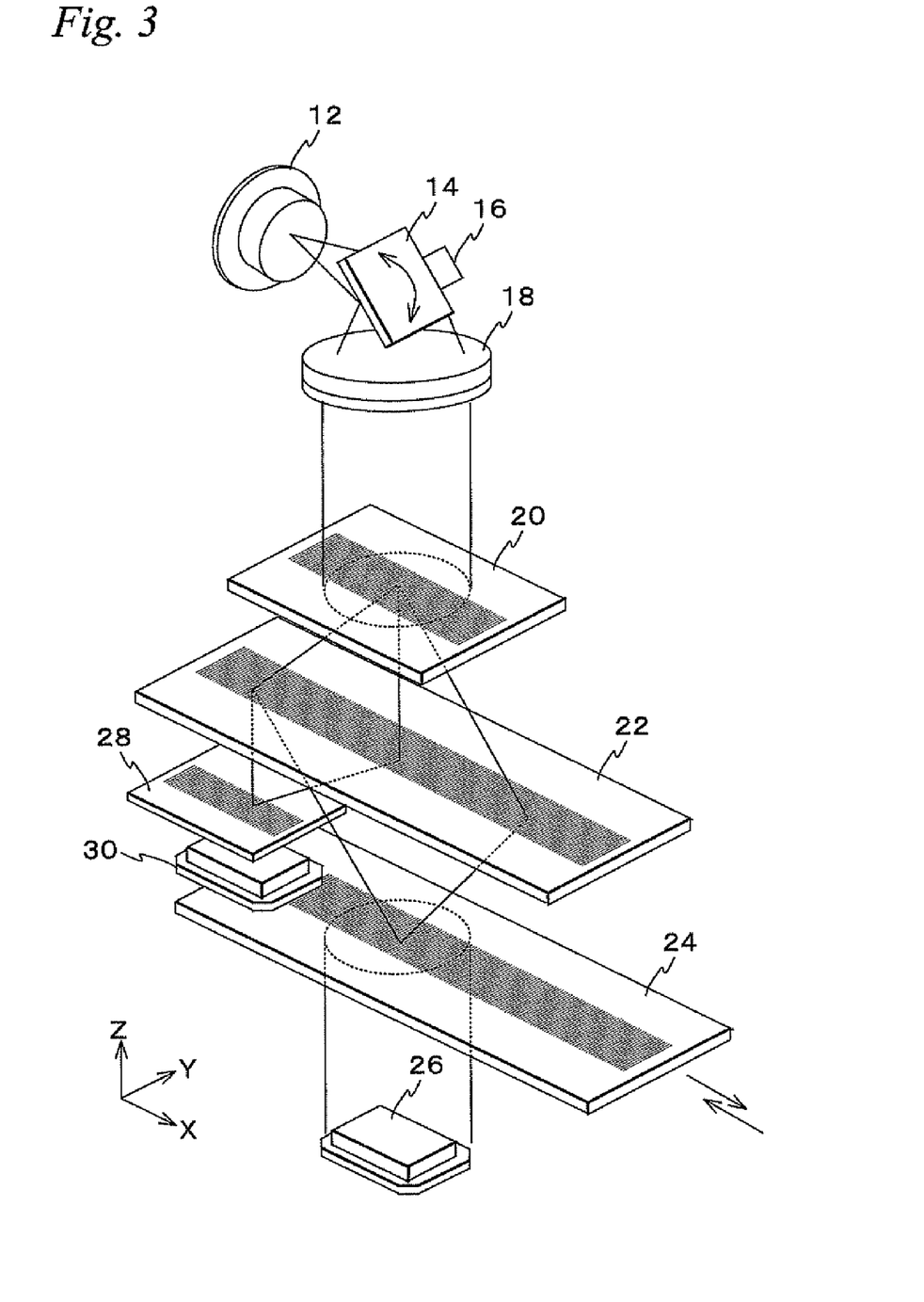
FIG. 3 is a view showing a modified example (No. 2) of the first embodiment.

Further, in the first embodiment described above, the light via second index scale 22 is to be split using beam splitter BS and the split light is to be received by second light-receiving element 30 via reference scale 28, but the present invention is not limited thereto, and the configuration as shown in FIG. 3 can also be employed. In the configuration shown in FIG. 3, first index scale 20 generates a zero-order light, a+first-order diffracted light and a −first-order diffracted light based on the incident light. When the−first-order diffracted light generated at first index scale 20 is incident on second index scale 22, second index scale 22 produces a+first-order diffracted light and a zero-order light. Such a+first-order diffracted light is irradiated to movable scale 24 and the zero-order light is irradiated to reference scale 28.

Further, when the+first-order diffracted light generated at first index scale 20 is incident on second index scale 22, second index scale 22 produces a−first-order diffracted light and such a−first-order diffracted light is irradiated to movable scale 24 and overlaps with the+first-order diffracted light to interfere with the+first-order diffracted light on movable scale 24.

Moreover, when the zero-order light that has passed through first index scale 20 is incident on second index scale 22, a−first-order diffracted light is produced and such a −first-order diffracted light is irradiated to reference scale 28 and overlaps with the zero-order light to interfere with the zero-order on reference scale 28.

Then, second light-receiving element 30 detects the intensity of the interference light that has passed through reference scale 28 and first light-receiving element 26 detects the intensity of the interference light that has passed through movable scale 24.

Figure 4:
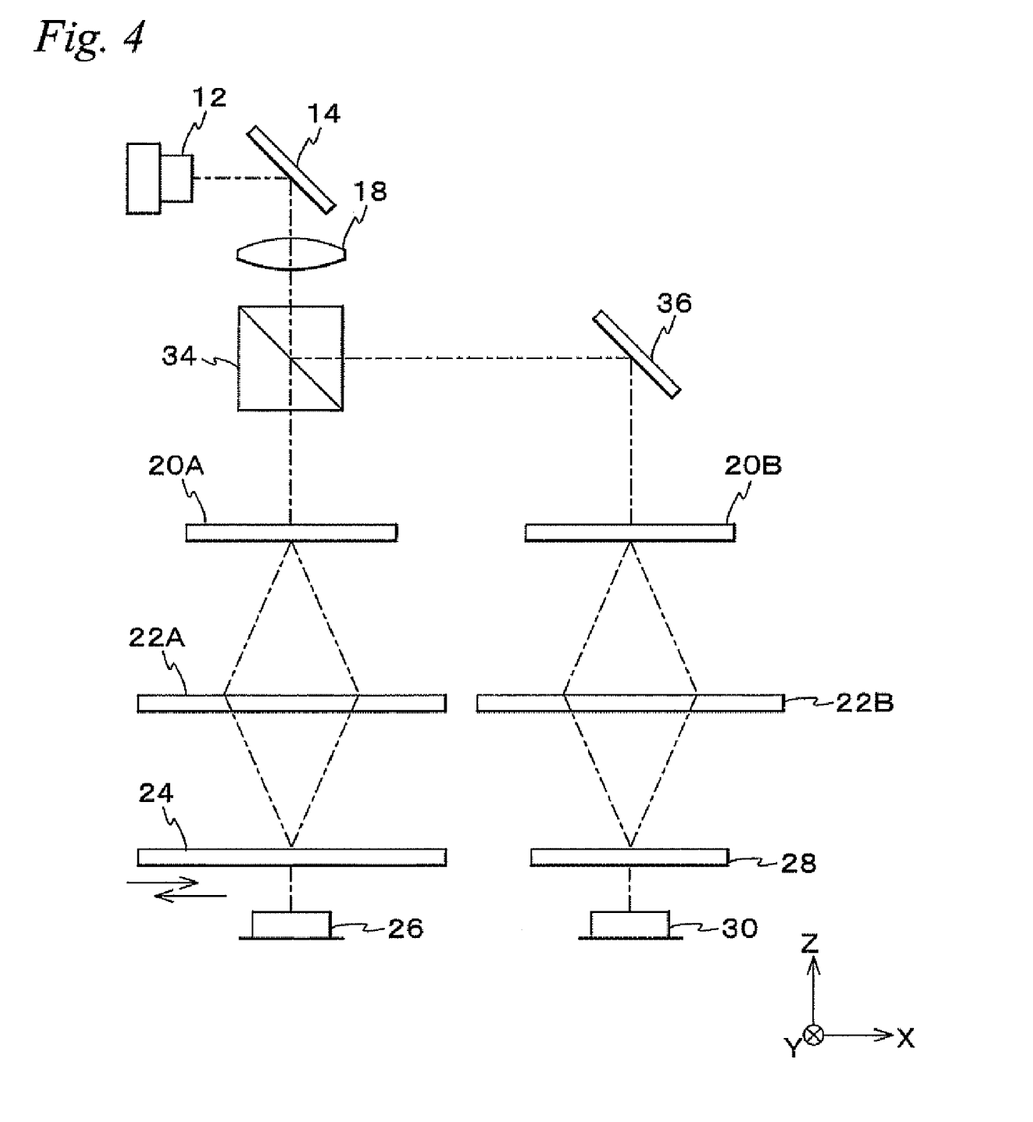
FIG. 4 is a view showing a modified example (No. 3) of the first embodiment.

Further, in the first embodiment described above, the measurement is to be performed using the lights via first index scale 20 and second index scale 22, but the present invention is not limited thereto, and for example, the configuration as shown in FIG. 4 may also be employed. That is, first index scales 20A and 20B and second index scales 22A and 22B are separately arranged so as to correspond to movable scale 24 and reference scale 28 respectively, and a beam splitter 34 and a reflection mirror 36 may be arranged so that a light is incident on each of the scales. Even if such a configuration is employed, measurement similar to the first embodiment described above can be performed.

Incidentally, not limited to the configuration in FIG. 4, for example, first index scales 20A and 20B are not separately arranged, but may be configured as an integrated scale, or for example, second index scales 22A and 22B are not separately arranged but may be configured as an integrated scale.

Further, a configuration may also be employed in which a light is split before reaching first index scale 20 in FIG. 1, and reference scale 28 is placed in an optical path of the split light and the light via the reference scale 28 is received by second light-receiving element 30.

Further, in the first embodiment described above, the case has been described where the angle of the laser light from light source 12 is periodically modulated by periodically changing the angle of oscillating mirror 14, but the present invention is not limited thereto, and for example, an arrangement may also be employed in which the laser light is modulated after having passed through movable scale 24 but before being received by first light-receiving element 26, and also the laser light is modulated after having reached reference scale 28 but before being received by second light-receiving element 30. In this case, for example, between movable scale 24 and first light-receiving element 26 and also between reference scale 28 and second light-receiving element 30, an oscillating mirror may be arranged or another modulator may be arranged.

Incidentally, in the first embodiment described above, the case has been described where the grating pitch of second index scale 22 is a half of the grating pitch of first index scale 20, but the present invention is not limited thereto, and for example, the grating pitch of second index scale 22 may be 1/n ("n" is an arbitrary positive integer) of the grating pitch of first index scale 20.

Further, the respective grating pitches are made to be the same pitch and±second-order diffracted lights may be generated at second index scale 22.

Second Embodiment

Next, a second embodiment of the present invention will be described using FIG. 5. Incidentally, in order to avoid complication of the description, the same reference signs will be assigned to the constituents same as or equivalent to those in the first embodiment described previously, and their description will be simplified or omitted.

Figure 5:
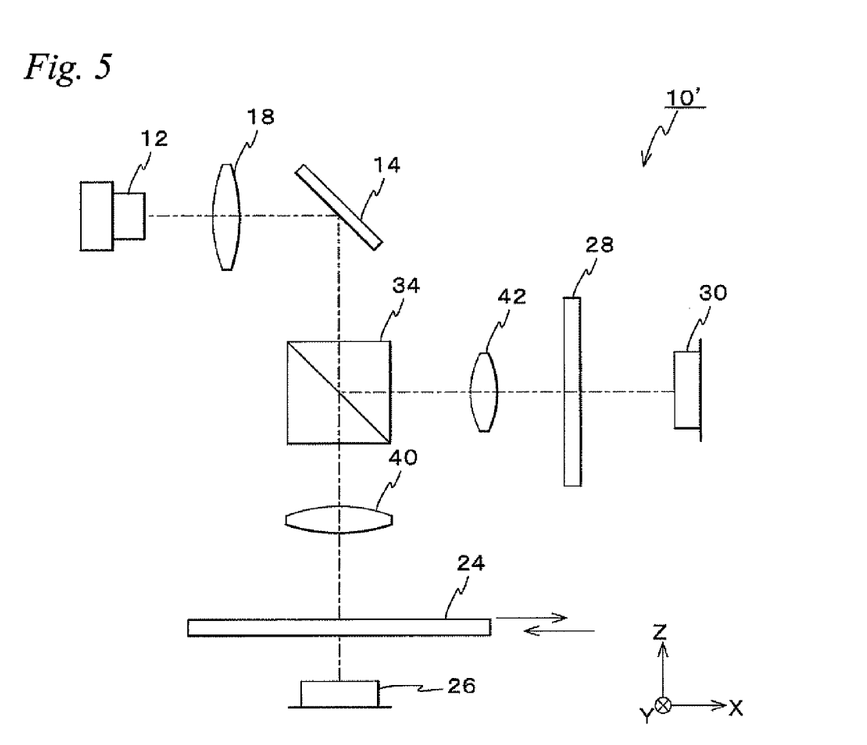
FIG. 5 is a schematic view showing an encoder related to a second embodiment.

An encoder 10' shown in FIG. 5 is an encoder by a so-called pickup method, and includes: light source 12; collimator lens 18; oscillating mirror 14; a beam splitter 34; a condenser lens 40, movable scale 24 and first light-receiving element 26 that are sequentially placed in an optical path of a laser light that has been transmitted through beam splitter 34; and a condenser lens 42, reference scale 28 and second light-receiving element 30 that are sequentially placed in an optical path of a laser light that has reflected off beam splitter 34.

Similarly to the first embodiment described above, oscillating mirror 14 is placed on the +X side of light source 12 in FIG. 5, and reflects a laser light that enters from the −X side substantially toward the −Z direction. Oscillating mirror 14 is periodically oscillated in a rotational direction around the Y-axis by a drive mechanism (not shown) including an actuator. Accordingly, to be exact, a reflection direction of the light that enters from the −X side to oscillating mirror 14 differs depending on the orientation of the reflection surface of oscillating mirror 14, and thereby the angle of the laser light incident on beam splitter 34 is periodically modulated.

According to such an encoder 10', a laser light emitted from light source 12 is converted into a parallel light by collimator lens 18 and reflected off oscillating mirror 14, and then is incident on beam splitter 34. Then, the laser light that has been transmitted through beam splitter 34 is converged on the surface of movable scale 24 via condenser lens 40.

Since a transmissive-type phase diffraction grating is formed on the surface of movable scale 24 as in the first embodiment, a transmitted light having a periodic (sine-curved) amplitude in accordance with the position of movable scale 24 is emitted. This transmitted light is received by first light-receiving element 26 and converted into an electric signal, and then the electric signal is output to a controller (not shown).

Meanwhile, a light reflected off beam splitter 34 is also converged on the surface of reference scale 28 via condenser lens 42. Since a transmissive-type phase diffraction grating (e.g. a phase diffraction grating having the same pitch as that of the phase diffraction grating formed on movable scale 24) is formed also on the surface of reference scale 28 as in the first embodiment, a transmitted light having a periodic amplitude in accordance with the position of reference scale 28 is emitted. This transmitted light is received by second light-receiving element 30 and converted into an electric signal, and then the electric signal is output to a controller (not shown).

In this case, also in the second embodiment, since the positional relations between reference scale 28 and light source 12 and the like are fixed (maintained), the output from second light-receiving element 30 shows only information on oscillation of the beam and therefore information on the oscillation center of the beam can be acquired from the output.

Accordingly, also in the second embodiment, by the controller (not shown) performing position computation of movable scale 24 related to the X-axis direction using the output of first light-receiving element 26 (output 1), the output of second light-receiving element 30 (output 2), and the equation (1) descried previously, the position of movable scale 24 in the X-axis direction can be computed without being affected by the drift described previously.

As is described above, according to encoder 10' of the second embodiment, similarly to the first embodiment, a laser light is split by beam splitter 34 and one of the split lights is received by first light-receiving element 26 via movable scale 24 and the other of the split lights is received by second light-receiving element 30 via reference scale 28, and therefore, high-precision movement information of movable scale 24 can be measured by computing the position of movable scale 24 using the output of first light-receiving element 26 and the output of second light-receiving element 30, without being affected by the drift of the modulation center (the oscillation center) of the beam.

Figure 6:
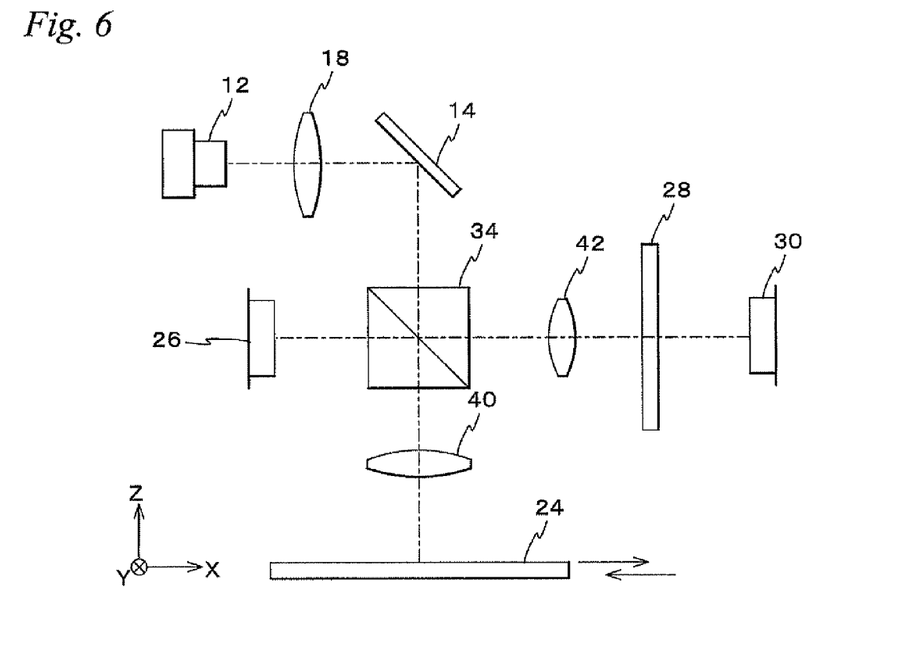
FIG. 6 is a view showing a modified example of the second embodiment.

Incidentally, in the second embodiment described above, the case has been described where movable scale 24 and reference scale 28 are transmissive-type scales, but the present invention is not limited thereto, and as is shown in FIG. 6, movable scale 24 can be a reflective-type scale. In this case, a light that has been reflected off movable scale 24 and has been transmitted through condenser lens 40 again is reflected off beam splitter 34, and therefore, first light-receiving element 26 may be arranged at a position where the reflected light can be received. Also in this case, the measurement similar to the second embodiment described above can be performed. Further, reference scale 28 can be a reflective-type scale, or both movable scale 24 and reference scale 28 may also be reflective-type scales.

Incidentally, in the first and second embodiments described above, the case has been described where oscillating mirror 14 is periodically driven in the rotational direction around the Y-axis as a method to modulate the laser light, but the present invention is not limited thereto. For example, a drive device that drives the oscillating mirror is deleted to be replaced with a simple reflection mirror, and light source 12 may be periodically oscillated along the Z-axis instead of oscillating the mirror. Further, collimator lens 18 may be periodically oscillated along the X-axis without oscillating light source 12. Moreover, the laser light may be periodically oscillated by placing an acoustooptic element (AOM) or an electrooptic element (EOM) between light source 12 and collimator lens 18.

Incidentally, in the first and second embodiments described above, oscillating mirror 14 is to be employed, but instead of the oscillating mirror, a crystal or a tuning-fork-type crystal may also be used.

The point is that various modulation devices can be used as far as the device has a configuration in which the positions of grating images of diffracted lights on movable scale 24 and reference scale 28 are periodically changed in an arrangement direction of a phase diffraction grating arranged on the movable scale surface and a phase diffraction grating arranged on the reference scale surface, respectively.

Further, in the first and second embodiments described above, the case has been described where by changing the optical axis of the laser light with a beam-splitting element (first index scale 20 in FIGS. 1, 2 and 3, and beam splitter 34 in FIGS. 4, 5 and 6) being fixed, the incident angle of the laser light with respect to the beam-splitting element is changed, but the present invention is not limited thereto, and the incident angle of the laser light with respect to the beam-splitting element may also be changed by changing the angle of the beam-splitting element with respect to the optical axis of the laser light, with the optical axis up to the beam-splitting element being fixed. The point is that the relative incident angle between the beam-splitting element and the laser light only has to be changed.

Incidentally, in the first and second embodiments described above, the grating pitches of the diffraction gratings that movable scale 24 and reference scale 28 have are to be the same, but the present invention is not limited thereto, and different grating pitches may also be employed. In this case, the conversion coefficient k in the equation (1) described previously only has to be changed.

Incidentally, in the first and second embodiments described above, the case has been described where as the scales, a scale having a diffraction grating is employed, but present invention is not limited thereto, and a scale on which a pattern having a light-shielding section and a light-transmitting section is formed may also be employed.

Further, in the first and second embodiments described above, the case has been described where the movable scale moves, but the present invention is not limited thereto, and the present invention can be employed also in the case where a section other than the movable scale such as an optical system moves. The point is that a configuration in which the movable scale and the optical system relatively move can be employed.

Incidentally, in the first and second embodiments described above, the configuration in which the illumination light is modulated has been described, but the present invention is not limited thereto, and the present invention can be employed also in the case where the illumination light is not modulated. That is, also in the case where the illumination light is not modulated, the measurement can be performed in a state where the drift of the illumination light with respect to the movable scale is cancelled.

Incidentally, in the first and second embodiments described above, the case has been described where only one pair of movable scale 24 and first light-receiving element 26 corresponding thereto and one pair of reference scale 28 and second light-receiving element 30 corresponding thereto are arranged, but the present invention is not limited thereto. For example, the former pair may be prepared in two or more, or the latter pair may be prepared in two or more, or both pairs may be prepared in two or more.

In such cases, for example, in the case where the former pair is prepared in two or more, the measurement direction can be two or more axes directions, or for example, the pair(s) can be used in another encoder such as a rotary encoder that detects a rotational amount of a rotatable body.

Further, for example, in the case where the latter pair is prepared in two or more, higher-precision measurement may be performed by averaging the measurement values of the second light-receiving elements of the respective pairs and correcting movement information of the movable scale using the average value or the like, or the pair(s) may be used in other various measurements.

Incidentally, in each of the embodiments described above, the case has been described where each of first and second index scales 20 and 22, movable scale 24 and reference scale 28 has a phase grating, but the present invention is not limited thereto, and an amplitude-type diffraction grating (a contrast-type diffraction grating) may also be employed. Further, the amplitude-type diffraction grating (the contrast-type diffraction grating) and the phase grating may be employed together.

Third Embodiment

Figure 7:
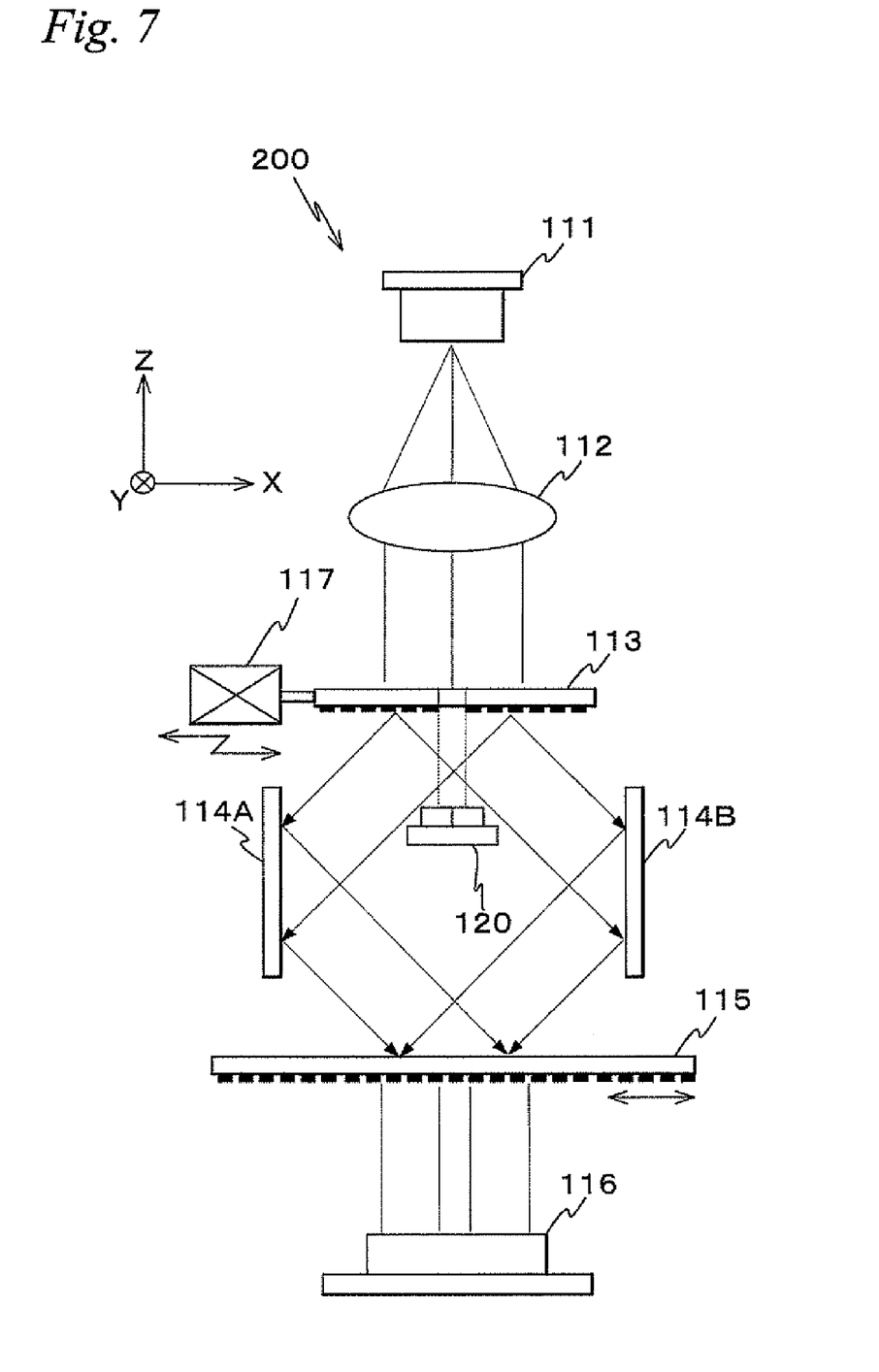
FIG. 7 is a view showing a schematic configuration of an optical system of an encoder related to a third embodiment.
Figure 8:
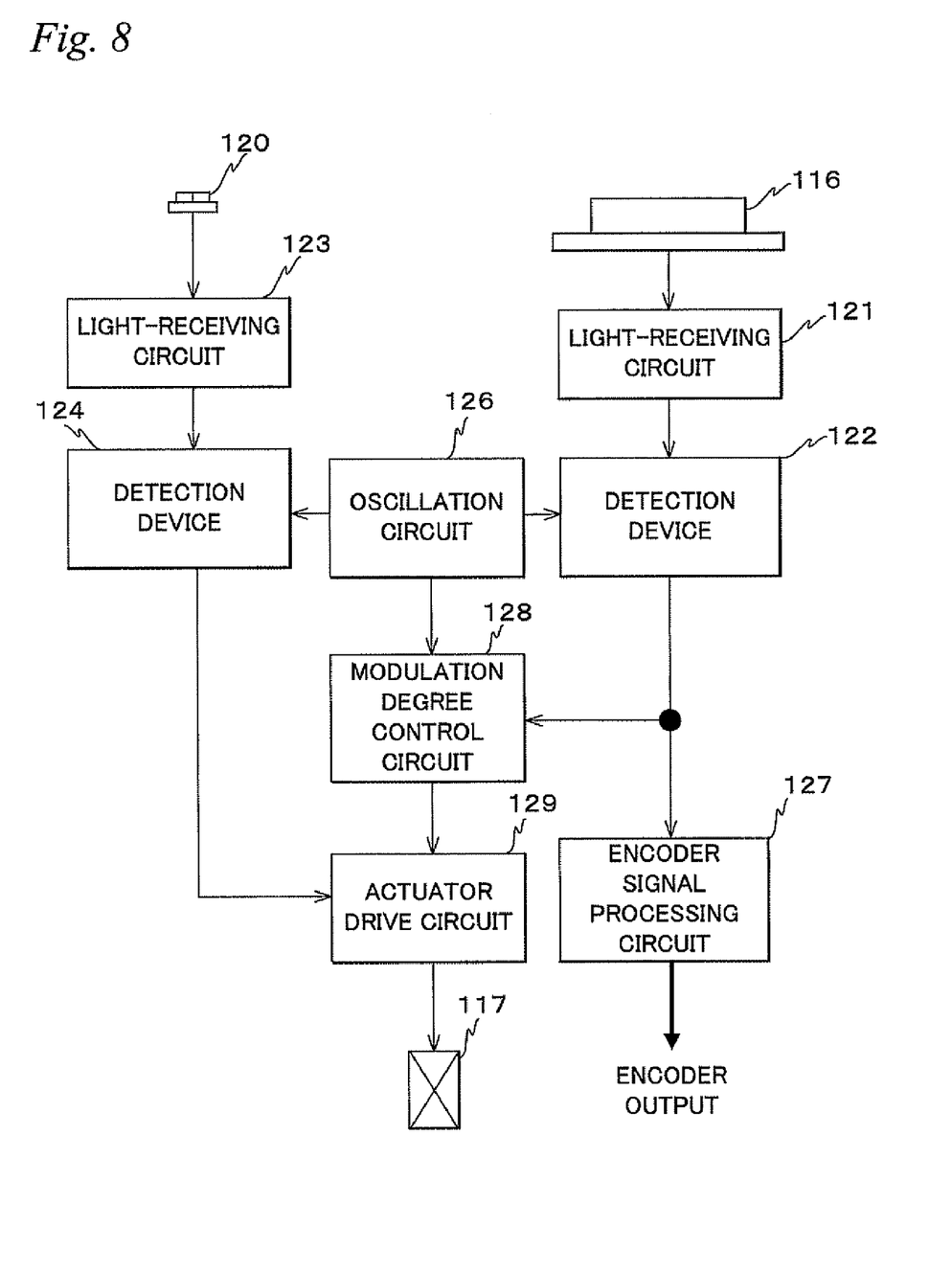
FIG. 8 is a view showing a schematic configuration of a signal processing system of the encoder related to the third embodiment.

A third embodiment of the present invention will be described below based on FIGS. 7 and 8. FIG. 7 shows a schematic configuration of an optical system of an encoder 200 related to the third embodiment of the present invention. As is shown in FIG. 7, the optical system of encoder 200 includes a light source 111, a collimator lens 112, an index scale 113, mirrors 114A and 114B, a movable scale 115, a light-receiving element 116, and a light-receiving element 120. Encoder 200 further includes an actuator 117 used to oscillate index scale 113.

Light source 111 is, for example, a laser light source that emits a laser light having a wavelength $\lambda=850$ nm. On index scale 113 and movable scale 115, a transmissive-type diffraction grating is arranged. The diffraction grating is, for example, a phase grating. The diffraction grating of index scale 113 and that of movable scale 115 have the same grating pitch p, and the grating pitch is set to be 50 μm or under, for example, around 8 μm. Actuator 117 is composed of, for example, a piezo element, and can oscillate in an amplitude of several μm and at a frequency of around 20 to 30 kHz.

The diffraction grating of index scale 113 is a diffraction grating at which a zero-order light is not generated but only ±first-order diffracted lights are generated. Incidentally, as index scale 113, a scale on which the difference in level of its gratings is set $\lambda/2$ so as to cause a phase difference between the lights passing though the respective gratings, thereby preventing the zero-order light from being generated.

In the center portion of index scale 113 in the X-axis direction, a section where the diffraction grating is not arranged, that is, a light-transmitting section. A light that is incident on this section from the +Z side is transmitted to the −Z side without being diffracted. That is, it can be said that index scale 113 is a beam-splitting optical system (a beam-separating optical member) that splits (separates) the incident light into the ±first-order diffracted lights that are irradiated to movable scale 115 and a transmitted light.

Light-receiving element 120 is placed immediately under the light-transmitting section of index scale 113. Light-receiving element 120 is a two-divided photodiode. The X-position of a boundary between the light-receiving surfaces is set so as to coincide with the oscillation center of index scale 113 in the X-axis direction.

In encoder 200 related to the third embodiment, the positional relation between light source 111, collimator lens 112, mirrors 114A and 114B, index scale 113, actuator 117, and light-receiving elements 116 and 120 is fixed. On the other hand, movable scale 115 is displaced along with a movable body (not shown, an object that is subject to measurement). A direction in which the movable scale 115 is displaced is a direction that is parallel to a formation surface of the diffraction grating of movable scale 115 and perpendicular to grating lines. Incidentally, in FIG. 7, a right handed XYZ orthogonal coordinate system is defined by a moving direction of movable scale 115 serving as the X-axis direction, a grating line direction of movable scale 115 serving as the Y-axis direction and a normal line direction of movable scale 115 serving as the Z-axis direction. The following description will be made using such an orthogonal coordinate system as needed.

Further, besides the constituents described above, encoder 200 includes, as is shown in FIG. 8, as a signal processing system, a light-receiving circuit 121 connected to light-receiving element 116, a detection device 122 that detects a displacement of movable scale 115, a light-receiving circuit 123 connected to light-receiving element 120, a detection device 124 that detects a signal for monitoring a midpoint, an oscillation circuit 126 that outputs a sine-wave signal (sin ωt) of an angular frequency ω, an encoder signal processing circuit 127 that generates and outputs an output signal of the encoder, a modulation degree control circuit 128 that controls the modulation degree, and an actuator drive circuit 129 that drives actuator 117.

In accordance with a sine-wave signal (sin ωt) of the angular frequency ω given from oscillation circuit 126, modulation degree control circuit 128 gives a modulation signal based on the sine wave to actuator drive circuit 129 and performs drive control of actuator 117. With this operation, the position of index scale 113 in the X-axis direction sinusoidally varies. Incidentally, when performing such control, control for keeping the modulation degree of modulation degree control circuit 128 at a constant value is also performed.

Light-receiving circuit 121 continuously drives light-receiving element 116 and also continuously loads the signal output from light-receiving element 116, and gives the signal to detection device 122. Detection device 122 detects a zero-order component, a first-order component, a second-order component, a third-order component, a fourth-order component and the like of the modulation frequency (to be described later) included in the signal. The zero-order component is used in control of a light quantity in a light source drive circuit (not shown) that drives the light source, and the first-order component, the second-order component, the third-order component, and the fourth-order component are used in control of the modulation degree in modulation degree control circuit 128.

Encoder signal processing circuit 127 loads the first-order component and the second-order component detected by detection device 122, and based on these components, generates, as a signal showing the displacement of movable scale 115, a sine signal showing the value of $\sin(4\pi x/p)$ and a cosine signal showing the value of $\cos(4\pi x/p)$, and outputs the signals as an encoder output. Since the sine signal and the cosine signal are generated by an interference signal I from the same light-receiving element 116 (are generated by the illumination light that has passed through the same area of movable scale 115), a phase relation between both signals does not vary even if the attitude of movable scale 115 varies.

Light-receiving circuit 123 continuously drives light-receiving element 120 and also continuously loads the signal output from light-receiving element 120, and gives the signal to detection device 124. Based on the light-receiving result of light-receiving element 120, detection device 124 detects a deviation of the output of the two-divided photodiode, and based on the detected deviation, detects the signal center of index scale 113 in the X-axis direction.

Next, the operations of encoder 200 will be described. Light source 111 emits an illumination light. The illumination light becomes a parallel light at collimator lens 112 and the parallel light is incident on index scale 113. The respective order diffracted lights are generated from the light incident on the diffraction grating of index scale 113 due to the diffraction action of the diffraction grating. The ±first-order diffracted lights generated at index scale 113 are set so as to intersect at the same position on movable scale 115 after being individually reflected off mirrors 114A and 114B. That is, the ±first-order diffracted lights separated at index scale 113 are incident on the same position on movable scale 115. Movable scale 115 diffracts the +first-order diffracted light emitted from index scale 113 to emit a −first-order diffracted light, and diffracts the −first-order diffracted light emitted from index scale 113 to emit a +first-order diffracted light. The ±first-order diffracted lights emitted from movable scale 115 both proceed to the −Z side, and are incident on light-receiving element 116 in a state of interfering with each other. Light-receiving element 116 outputs a signal (hereinafter, referred to as an interference signal I) that shows the interference intensity of the incident ±first-order diffracted lights.

In encoder 200, when actuator 117 is driven, the position of index scale 113 is periodically varied in the X-axis direction and the phase difference between the ±first-order diffracted lights on movable scale 115 is changed. Interference signal I is modulated by the change in the phase difference.

Detection device 122 inputs a pulse signal given by oscillation circuit 126 and performs synchronous detection of the signal with a sine wave ($\sin \omega t$) of an angular frequency $\omega$, a sine wave ($\sin \omega t$) of a twofold angular frequency $2\omega$ or the like of the pulse, and detects a first-order component and a second-order component of the signal. Encoder signal processing circuit 127 generates and outputs a sine signal and a cosine signal based on the extracted first and second components. Encoder signal processing circuit 127 outputs information on the displacement of movable scale 115 as an encoder output, based on the sine signal and the cosine signal.

Meanwhile, as is shown in FIG. 7, the light that has passed through the light-transmitting section of index scale 113 is received by light-receiving element 120 and a signal corresponding to the light-receiving result is sent to light-receiving circuit 123. Light-receiving circuit 123 converts the signal from light-receiving element 120 into a signal that can be processed by detection device 124, and sends the converted signal to detection device 124. Based on the converted signal, detection device 124 detects a positional drift quantity of the oscillation center of index scale 113. This detection result is sent to actuator drive circuit 129 and actuator drive circuit 129 gives actuator 117 a drive command so as to cancel out the positional drift quantity. With this operation, the oscillation center of index scale 113, that is, the position of the midpoint is controlled to be constant at all times.

As is described in detail above, according to the third embodiment, at index scale 113, the illumination light is separated into a light (a first light) for displacement detection of a movable body and a light (a second light) for midpoint monitor. The light for displacement detection of the movable body is irradiated to movable scale 115 and becomes a light that includes information on the relative displacement of movable scale 115, and the light for midpoint monitor is detected as a light that includes positional information of the illumination light in the X-axis direction. That is, in encoder 200 related to the present embodiment, index scale 113 is placed as a beam-separating optical system that separates the incident illumination light into ±first-order diffracted lights that are irradiated to movable scale 115 and a light passing through a light-transmitting section that includes information on the irradiation position of the ±first-order diffracted lights that are irradiated on movable scale 115, and the information on the irradiation position of the ±first-order diffracted lights is detected using the light that has passed through the light-transmitting section. Since the ±first-order diffracted lights and the light that has been transmitted through the light-transmitting section of index scale 113 are lights generated from the same illumination light, information on the irradiation position of the first light can accurately be detected by using the light that has been transmitted through the light-transmitting section.

Further, according the present embodiment, the first light for displacement detection of the movable body is a diffracted light other than the zero-order light that is produced by the diffraction grating formed on index scale 113, and the second light for midpoint monitor is a light through the section where the diffraction grating is not formed on index scale 113. In this arrangement, because the position of the light for midpoint monitor in the X-axis direction varies depending on the oscillation of index scale 113 in the X-axis direction, it becomes easy to detect the oscillation center of index scale 113 based on the light for midpoint monitor.

Further, in the present embodiment, as the diffraction grating on index scale 113, the one at which the zero-order light is not generated is employed. In this arrangement, because there is no incidence from the diffraction grating of index scale 113 to light-receiving element 120 for midpoint monitor, the midpoint can be monitored with high precision.

Incidentally, encoder 200 related to the present embodiment, as the diffraction grating of index scale 113, a diffraction grating at which the zero-order light is generated may also be employed. In this case, it is necessary to pay attention so that the zero-order light does not affect the detection of the displacement of movable scale 115 and the detection of the midpoint of index scale 113.

Further, a side wall for preventing the light from other sections than the light-transmitting section of index scale 113 from being obliquely incident may be arranged at light-receiving element 120. Further, in the center portion on the −Z side of index scale 113, that is, on the periphery of the light-transmitting section, a light-shielding film for preventing the incidence of the light to light-receiving element 120 may also be formed.

Incidentally, in encoder 200 related to the third embodiment, the light-transmitting section where the diffraction grating is not arranged is arranged in the center portion of index scale 113 in the X-axis direction, and based on the light that has passed through the light-transmitting section, the oscillation center of index scale 113 is detected, but the present invention is not limited thereto. For example, the diffraction grating is arranged on the entire surface of index scale 113, and the±first-order diffracted lights generated by the diffraction grating are irradiated on movable scale 115 to be used as lights for detecting the displacement of the movable body in the similar manner to the case of encoder 200 related to the present embodiment, and only the zero-order light from the diffraction grating is converged by the condenser lens, and the light-receiving result of the zero-order light may be used as information for detecting the positional drift of the illumination light in the X-axis direction.

Fourth Embodiment

Figure 9:
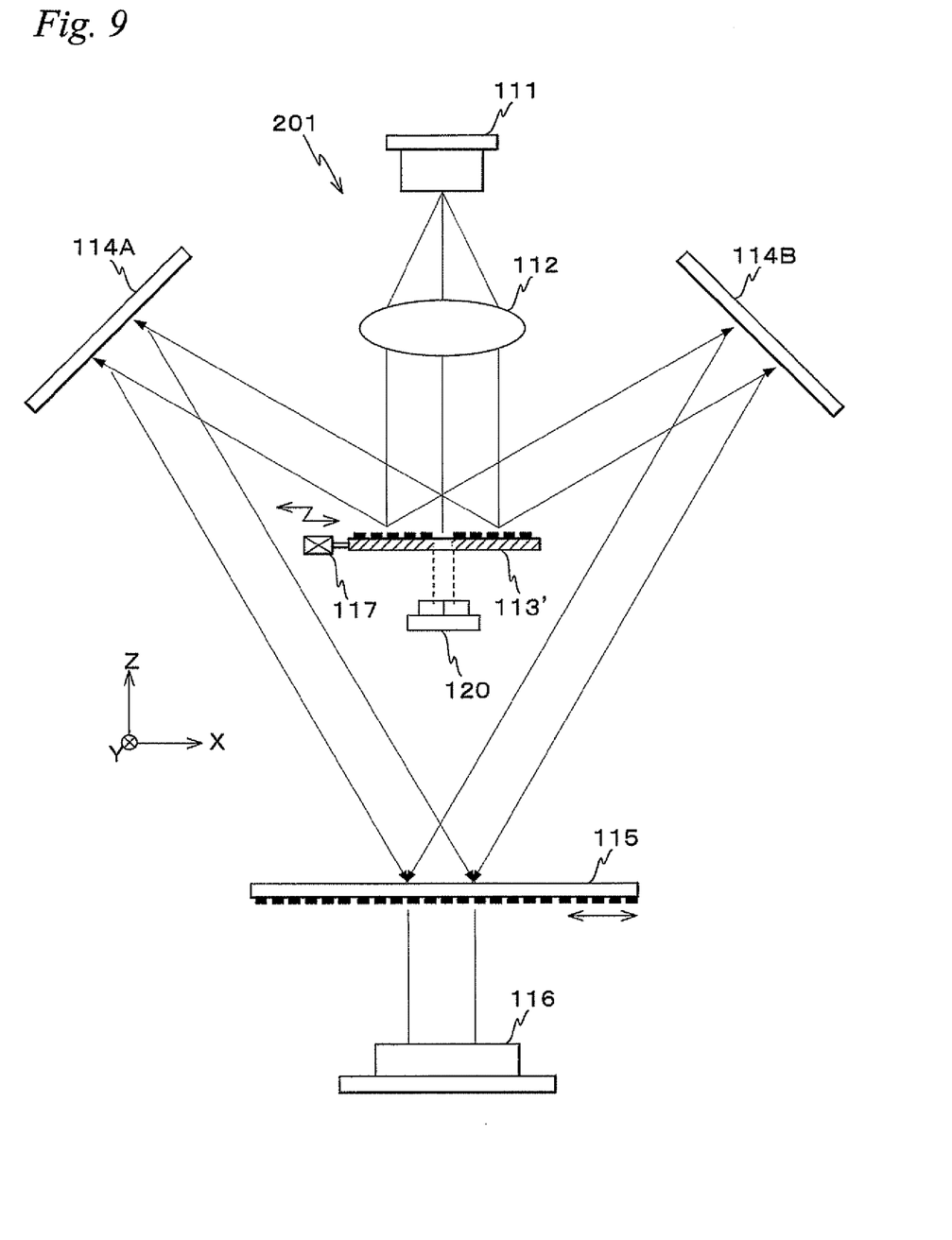
FIG. 9 is a view showing a schematic configuration of an optical system of an encoder related to a fourth embodiment.

Next, a fourth embodiment of the present invention will be described based on FIG. 9. FIG. 9 shows a schematic configuration of an optical system of an encoder 201 related to the fourth embodiment. As is shown in FIG. 9, encoder 201 is different from encoder 200 related to the third embodiment described above in the point that an index scale 113' having a reflective-type diffraction grating is arranged instead of index scale 113 having a transmissive-type diffraction grating. Further, in encoder 201, mirrors 114A and 114B are placed obliquely above index scale 113'.

The diffraction grating of index scale 113' is, for example, a phase grating. Similarly to index scale 113, index scale 113' has the diffraction grating whose grating pitch is p, and a zero-order light is not generated but only±first-order diffracted lights are generated. The±first-order diffracted lights generated from index scale 113' as reflected lights, are reflected off mirrors 114A and 114B, and are incident on the same position on movable scale 115.

±First-order diffracted lights emitted from movable scale 115 both proceed to the −Z side, and are incident on light-receiving element 116 in a state of interfering with each other. Similarly to the third embodiment, the position of index scale 113' is periodically oscillated in the X-axis direction by actuator 117, and therefore, a modulation signal (hereinafter, referred to as interference signal I) that shows the interference intensity of the incident±first-order diffracted lights is detected at light-receiving element 116. Since such a detection method of detecting the displacement of movable scale 115 from interference signal I is the same as in the encoder related to the third embodiment described above, the description will be omitted.

In the center portion of index scale 113' in the X-axis direction, there is a section where the diffraction grating is not arranged, that is, a light-transmitting section. The light incident on this section from the +Z side is transmitted through to the −Z side without being diffracted, similarly to the light-transmitting section of index scale 113. That is, it can be said that index scale 113' is a beam-separating optical member (a beam-splitting optical system) that separates (splits) the incident light into the±first-order diffracted lights that are irradiated to movable scale 115 and a transmitted light.

Light-receiving element 120 is placed immediately under the light-transmitting section of index scale 113'. Similarly to the third embodiment described above, light-receiving element 120 is a two-divided photodiode, and the X-position of a boundary between the light-receiving surfaces is set so as to coincide with the oscillation center of index scale 113' in the X-axis direction. In the present embodiment, similarly to the encoder related to the third embodiment described above, the deviation of the output of the two-divided photodiode is detected based on the light-receiving result of light-receiving element 120, and based on the detected deviation, the signal center of index scale 113' in the X-axis direction is detected.

Incidentally, the diffraction grating of index scale 113' may be a diffraction grating at which a zero-order light is generated.

Incidentally, in the present embodiment, a 90-degree prism or the like may be placed instead of mirrors 114A and 114B.

As is described in detail above, according to the present embodiment, because the proceeding direction of the light for detecting information on the displacement of the movable body and the proceeding direction of the light for monitoring the position of the illumination light in the X-axis direction are reversed, re-interference of both lights can be prevented and the displacement of the movable body and the center of the modulation can surely be detected.

Incidentally, in the third and fourth embodiments described above, a light-receiving element that receives the light for detecting the positional drift is to be the two-divided photodiode, but a CCD (Charge-Coupled Device) may also be employed. Further, a combination of a condenser lens and a photodiode may also be employed.

For example, a diaphragm is placed instead of light-receiving element 120, and in the rear of the diaphragm, a condenser lens and a light-receiving element having a single light-receiving surface are placed in this order, and by making the laser beam be incident on the light-receiving element only when the diaphragm and the converged position of a laser beam by the condenser lens coincide, drift of the variation center of the position of the laser beam can be detected as in the third and fourth embodiments described above. Further, instead of the condenser lens and the light-receiving element, a light-receiving element having a small light-receiving surface may also be used.

Further, instead of light-receiving element 120, a condenser lens, a knife-edge and a light-receiving element having a single light-receiving surface may also be placed in this order. A laser beam converged by the condenser lens is converged on the knife-edge. The light that has passed through without being shielded by the knife-edge is received by the light-receiving element and converted into an electric signal.

The setting is made so that a duty ratio of the signal output from the light-receiving element becomes 50% in the case where the oscillation center of the spot of the laser beam coincides with the end of the knife-edge, but the duty ratio of the signal output from the light-receiving element does not become 50% in the case where the oscillation center of the spot of the laser beam does not coincide with the end of the knife-edge. Accordingly, in this case, the oscillation center of the spot of the laser beam may be adjusted so that the duty ratio of the signal becomes 50%.

Further, in the encoder of the third or fourth embodiment described above, the detection signal is modulated by oscillating index scale 113 or 113' in the X-axis direction, but the present invention is not limited thereto, and the detection signal may also be modulated by periodically changing the incident angle with respect to index scale 113 or 113'. For example, a reflection mirror having an actuator 117 is placed between light source 111 and lens 112, and by periodically changing a reflection direction of a light emitted from light source 111, the incident angle with respect to index scale 113 or 113' can periodically be changed. Further, in this case, as the reflection mirror having actuator 117, a crystal oscillator can be used. Further, the detection signal may also be modulated by periodically changing the position of light source 111, or the detection signal may also be modulated by periodically changing the outgoing position of an illumination light from light source 111.

Incidentally, in the encoder related to the third or fourth embodiment, light source 111 or collimator lens 112 may be oscillated. Further, the present invention can also be applied to an encoder that does not employ the modulation method, unlike the encoder related to the third or fourth embodiment described above.

Incidentally, the present invention can also be applied to an encoder by a slit shutter method.

While the above-described embodiments of the present invention are the presently preferred embodiments thereof, those skilled in the art of lithography systems will readily recognize that numerous additions, modifications, and substitutions may be made to the above-described embodiments without departing from the spirit and scope thereof. It is intended that all such modifications, additions, and substitutions fall within the scope of the present invention, which is best defined by the claims appended below.

What is claimed is:

1. An encoder, comprising:
   a scale for measurement on which a pattern arranged along a predetermined direction is formed;
   a beam-splitting optical system that splits an incident illumination light at least into a first light that is irradiated to the scale for measurement and a second light that includes information on an irradiation position of the first light on the scale for measurement;
   a photoreceiver for the second light that receives the second light;
   a detection device that detects the information on the irradiation position of the first light on the scale for measurement based on a light-receiving result of the photoreceiver for the second light;
   a photoreceiver for the first light that receives an interference light of the first light via the scale for measurement;
   a scale for detection of which a positional relation with the beam-splitting optical system is fixed and to which the second light is irradiated; and
   a modulator that modulates the first light in an arrangement direction of the first pattern, and also modulates the second light in an arrangement direction of the second pattern, wherein the scale for measurement is displaced relative to the beam-splitting optical system,
   the photoreceiver for the second light receives a light via the scale for detection,
   the detection device computes the relative displacement of the scale for measurement based on a light-receiving result of the photoreceiver for the first light and a light-receiving result of the photoreceiver for the second light,
   the scale for measurement has a first pattern arranged in a direction in which the scale for measurement is displaced,
   the scale for detection has a second pattern arranged along an arrangement direction of the first pattern, and
   the beam-splitting optical system has:
   a beam-splitting element that splits the illumination light into two lights, and
   an optical member that makes the two lights interfere with each other on the scale for measurement and on the scale for detection, wherein
   the first light is a light that is obtained by part of the two respective lights interfering on the scale for measurement, and
   the second light is a light that is obtained by part of the two respective lights interfering on the scale for detection.

2. The encoder according to claim 1; wherein
   the modulator modulates the first light after the first light has reached the first pattern but before the first light is received by the photoreceiver for the first light, and also modulates the second light after the second light has reached the second pattern but before the second light is received by the photoreceiver for the second light.

3. The encoder according to claim 1, wherein the modulator periodically modulates an angle of the illumination light incident on the beam-splitting optical system.

4. The encoder according to claim 1, wherein
   an arrangement pitch of the first pattern and an arrangement pitch of the second pattern are the same.

5. The encoder according to claim 1, wherein
   the optical member has a beam splitter that splits the two lights into a light incident on the scale for measurement and a light incident on the scale for detection.

6. The encoder according to claim 1, wherein
   the modulator periodically modulates a relative positional relation between the beam-splitting element and the illumination light incident on the beam-splitting element.

7. The encoder according to claim 1, wherein
   the modulator periodically changes an angle of the illumination light incident on the beam-splitting element.

8. The encoder according to claim 1, wherein
   the pattern formed on the scale for measurement is a diffraction grating,
   an irradiation position of the illumination light on the scale for measurement periodically varies along the predetermined direction, and
   the detection device detects a variation center of the irradiation position of the illumination light based on a light-receiving result of the photoreceiver.

9. The encoder according to claim 1, wherein
   the photoreceiver for the second light receives an interference light of the second light.

10. An encoder comprising:
    a scale for measurement on which a pattern arranged along a predetermined direction is formed;
    a beam-splitting optical system that splits an incident illumination light at least into a first light that is irradiated to the scale for measurement and a second light that includes information on an irradiation position of the first light on the scale for measurement;
    a photoreceiver for the second light that receives the second light;
    a detection device that detects the information on the irradiation position of the first light on the scale for measurement based on a light-receiving result of the photoreceiver for the second light;
    a photoreceiver for the first light that receives an interference light of the first light via the scale for measurement;
    a scale for detection of which a positional relation with the beam-splitting optical system is fixed and to which the second light is irradiated; and
    a modulator that modulates the first light in the arrangement direction of the first pattern, and also modulates the second light in an arrangement direction of the second pattern, wherein the scale for measurement is displaced relative to the beam-splitting optical system,
    the photoreceiver for the second light receives a light via the scale for detection,
    the detection device computes the relative displacement of the scale for measurement based on a light-receiving result of the photoreceiver for the first light and a light-receiving result of the photoreceiver for the second light, the scale for measurement has a first pattern arranged in a direction in which the scale for measurement is displaced, the scale for detection has a second pattern arranged along an arrangement direction of the first pattern, and the beam-splitting optical system has:

a beam-splitting element that splits the illumination light into three lights, and an optical member that makes two lights of the three lights interfere with each other on the scale for measurement and also makes two lights of the three lights interfere with each other on the scale for detection.

11. The encoder according to claim 10, wherein
the modulator periodically changes a position of a grating image of a diffracted light on the scale for measurement and the scale for detection in the arrangement direction of the first pattern and the second pattern.

12. The encoder according to claim 10, wherein
the modulator periodically modulates a relative positional relation between the beam-splitting element and the illumination light incident on the beam-splitting element.

13. The encoder according to claim 10, wherein
the modulator periodically changes an angle of the illumination light incident on the beam-splitting element.

* * * * *